United States Patent [19]

Grard et al.

[11] Patent Number: 5,276,751
[45] Date of Patent: Jan. 4, 1994

[54] DEVICE INCLUDING A TRANSVERSELY ANISOTROPIC OPTICAL FIBER, AND A METHOD OF MANUFACTURING IT

[75] Inventors: Emmanuel Grard, St Michel sur Orge; Daniel Mousseaux, Palaiseau; Fabrice Pitel, Etrechy, all of France

[73] Assignee: Alcatel Cit, Paris, France

[21] Appl. No.: 906,097

[22] Filed: Jun. 29, 1992

[30] Foreign Application Priority Data

Jun. 28, 1991 [FR] France .................. 91 08078

[51] Int. Cl.$^5$ .................................. G02B 6/36
[52] U.S. Cl. ............................ 385/66; 385/84; 385/92
[58] Field of Search ............. 385/60, 66, 78, 84, 88, 90, 91, 92, 93

[56] References Cited

U.S. PATENT DOCUMENTS

| | | | |
|---|---|---|---|
| 4,645,295 | 2/1987 | Pronovost | 385/60 |
| 4,673,244 | 6/1987 | Miles | 385/91 |
| 4,755,021 | 7/1988 | Dyott | 385/123 |
| 4,790,618 | 12/1988 | Abe | 385/93 |
| 4,883,342 | 11/1989 | Ishii et al. | 385/90 |
| 4,907,853 | 3/1990 | Hiratsuka | 385/60 |
| 4,919,509 | 4/1990 | Miller et al. | 385/55 |
| 5,074,682 | 12/1991 | Uno et al. | 385/93 |

FOREIGN PATENT DOCUMENTS

0215674 3/1987 European Pat. Off. .
0372448 6/1990 European Pat. Off. .
0381513 8/1990 European Pat. Off. .

OTHER PUBLICATIONS

OFC'89 "Conference on Optical Fiber Communication", Houston, Feb. 6-9, Frederick M. Sears, Calvin M. Miller, W. A. Vicory, and D. N. Ridgway: Enhanced Rotary Mechanical Splice for Rectangular Polarization-Maintaining Fibers.
Patent Abstracts of Japan, vol. 10, No. 152, p. 462, Jun. 3, 1986 (JPA 61 006 610).
Patent Abstracts of Japan, vol. 5, No. 191, p. 92, Dec. 5, 1981 (JPA 56 114 909).
Patent Abstracts of Japan, vol. 14, No. 84, p. 1007, Feb. 16, 1990 (JPA 1 296 204).

*Primary Examiner*—Frank Gonzalez
*Attorney, Agent, or Firm*—Sughrue, Mion, Zinn, Macpeak & Seas

[57] ABSTRACT

The side surface of a ferrule (16) carrying a polarization-maintaining option fiber (10) has a projecting substantially dihedral-angled portion (17, 19) engaged in a complementary re-entrant substantially dihedral angled portion (22, 24) formed in a ferrule receiver (20). The invention is particularly applicable to making a laser-emitting head for an optical fiber telecommunications network.

7 Claims, 2 Drawing Sheets

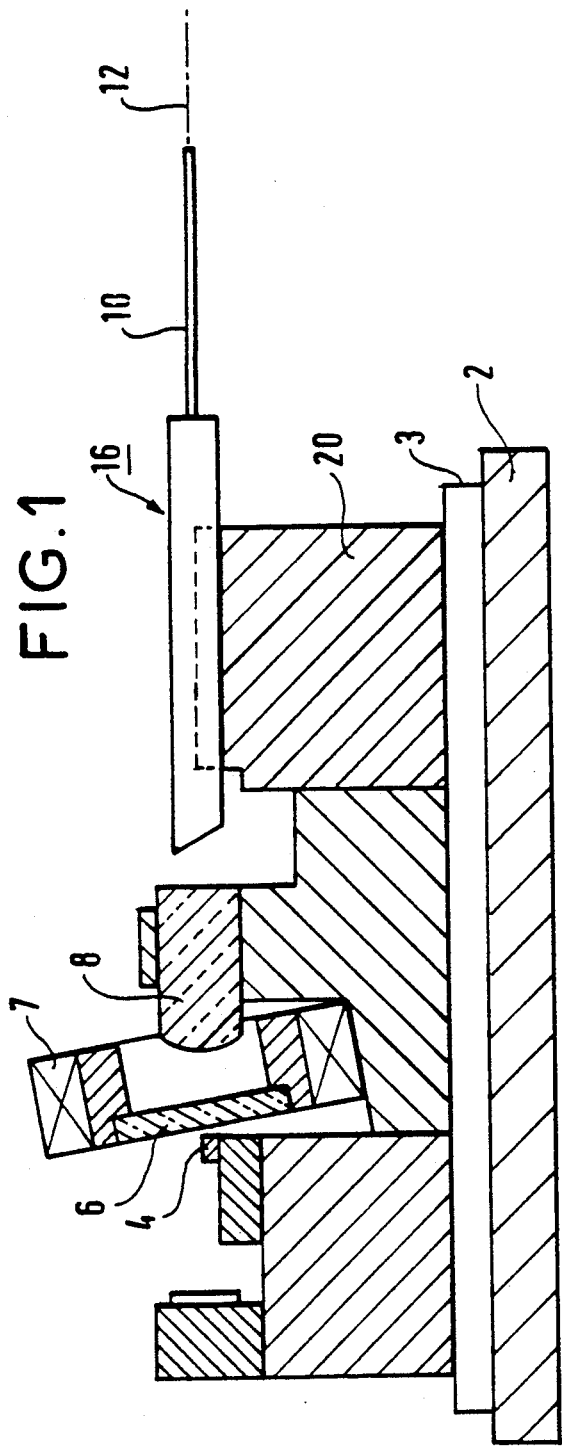

DEVICE INCLUDING A TRANSVERSELY ANISOTROPIC OPTICAL FIBER, AND A METHOD OF MANUFACTURING IT

The present invention relates to the use of optical fibers that are anisotropic in a transverse plane. A typical purpose of such anisotropy is for the light injected into such fibers to be guided and/or absorbed to a greater or lesser extent in a manner that depends on the polarization of said light.

Such fibers comprise in particular polarizing fibers and fibers for maintaining polarization. When such a fiber is installed during the manufacture of such a device, there is a particular need to ensure correct angular positioning of said fiber about its own longitudinal axis. The purpose of such positioning is typically to cause a privileged plane of the fiber, which plane is defined relative to the fiber and includes said axis, to coincide with a plane of polarization for light that is to travel along the fiber, which plane is defined relative to the device to be manufactured.

In addition, when such proper positioning has been obtained, there is a need for it to be conserved unchanged throughout the service life of the device.

A known device for this purpose comprises the following elements:

a support structure;

optical components fixed to said structure to interact with light having a plane of polarization, such that said plane of polarization is defined relative to said structure;

a transversely anisotropic optical fiber for guiding said light, said fiber having a longitudinal axis and defining a privileged plane including said axis and which is to coincide with said plane of polarization;

a ferrule securely carrying and surrounding said fiber, a side surface of said ferrule being parallel to said longitudinal axis, a cross-section of said side surface having a positioning projection which is angularly located so that the privileged plane of said fiber is defined by the angular position of said projection, said side surface having bearing surfaces for enabling said ferrule to be carried and for defining its position in transverse translation; and a ferrule receiver carried by said support structure for receiving said ferrule, said receiver having reception surfaces for receiving the bearing surfaces of said ferrule and having a positioning recess which is angularly positioned to receive said positioning projection in such a manner that when said bearing surfaces bear against said reception surfaces and said projection is inserted in said recess, said plane of polarization of the light is caused to coincide with the privileged plane of the fiber.

This known device is described in the article "Enhanced rotary mechanical splice for rectangular polarization-maintaining fibers" by Frederick M. Sears, Calvin M. Miller, W. A. Vicory, and D. N Ridgway given at the OFC'89 "Conference on optical fiber communication" that took place in Houston, Feb. 6-9, 1989.

The ferrule of that known device has a cross-section that is circular and it includes a positioning projection that is rectangular in section.

To obtain accurate angular positioning of said ferrule relative to its receiver requires firstly difficult machining during manufacture of the ferrule and its receiver, and then greater care during assembly thereof, such that the accuracy finally obtained is sometimes poor. Finally, it is difficult to obtain final fixing of the ferrule in its receiver in such a manner as to avoid any risk of subsequent relative displacement.

Particular objects of the present invention include easily providing a ferrule for receiving a fiber as defined above, easily and reliably obtaining accurate angular position of said ferrule in its receiver, and easily obtaining final mechanically-strong fixing of said ferrule in said receiver. More particularly, an object of the invention is to facilitate bonding said ferrule to said receiver.

These objects are achieved, in particular, by a transversely anisotropic optical fiber device characterized by the fact that the side surface of a ferrule carrying said fiber presents a projecting substantially dihedral-angled portion engaged in a complementary re-entrant substantially dihedral-angled portion formed in a ferrule receiver.

An implementation of the present invention is described in greater detail below by way of non-limiting example and with reference to the accompanying diagrammatic figures. When the same item is shown in a plurality of figures, it is designated in all of them by the same reference symbol. It should be understood that the items described may be replaced by other items providing the same technical functions.

FIG. 1 is a longitudinal section through a device of the invention.

FIG. 2 is a cross-section through the ferrule of said device ant through the receiver carrying the ferrule.

Figure 3:
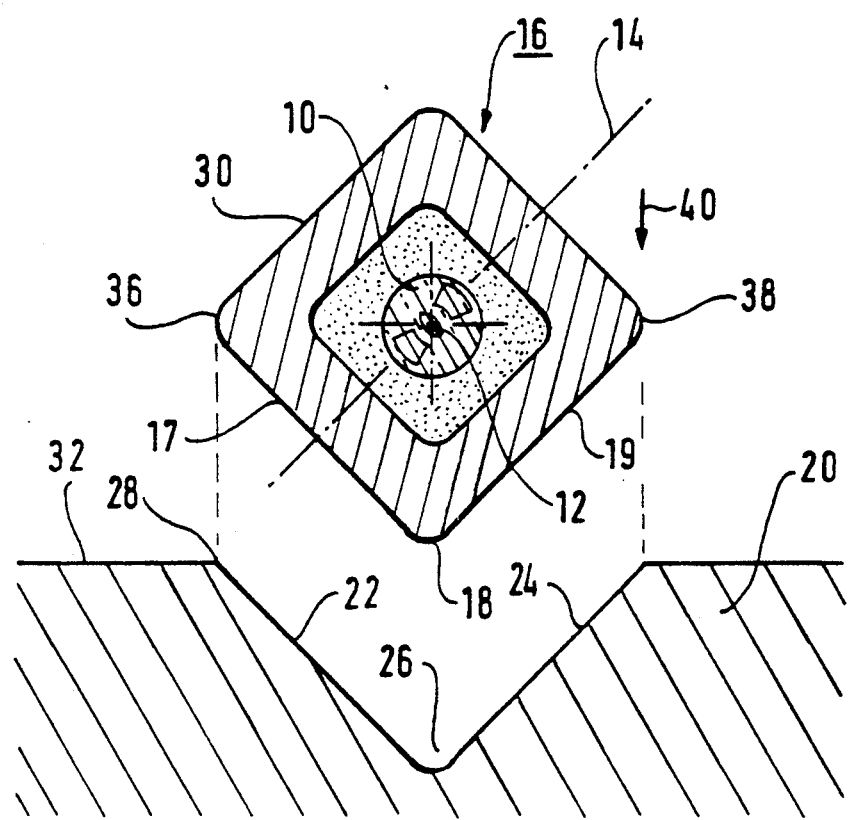
FIG. 3 is a cross-section on a larger scale showing said ferrule facing its receiver.

The device comprises a laser-emitting head for use, for example, in an optical fiber telecommunications network. It includes a support structure constituted by a metal base plate 2, and by optical components fixed on said base plate by means of elements 3.

These optical components comprise a semiconductor laser chip 4, a crystal plate 6 surrounded by a permanent magnet 7 to constitute a Faraday rotator, and a focusing lens 8. The laser chip emits light polarized in a plane perpendicular to the plane of the figure and the Faraday rotator rotates the plane of polarization through 45°.

At the outlet from these components, the plane of polarization of the light is thus defined relative to the structure 2.

Thereafter, the device includes a transversely anisotropic optical fiber 10 which receives the light focused by the lens 8. This fiber guides the light. It has a longitudinal axis 12 and it defines a privileged plane 14 including said axis and which must be caused to coincide with said plane of polarization.

The fiber is more particularly a polarizing fiber which passes light vibration in a privileged plane only. This provides an optical isolator. The function of the isolator is to prevent interfering light returned towards the laser-emitting head by the fiber 10 reaching the laser chip 4 in a plane of polarization parallel to that of the light emitted by the chip. This function is useful since such light in said plane of polarization disturbs the operation of the laser chip.

At a distance from the laser emitting head, the polarizing fiber 10 is connected to an ordinary optical fiber, i.e. to a fiber that is transversely isotropic.

To secure the fiber 10, the device includes a ferrule 16 surrounding said fiber and carrying it securely. The outside surface of said ferrule is parallel to the longitudinal axis 12 and it has bearing surfaces 17 and 19. The cross-section of said outside surface has a positioning projection 18.

A ferrule receiver 20 is carried by the support structure 2 for the purpose of receiving the ferrule. It has receiving surfaces 22 and 24 for receiving the bearing surfaces of said ferrule, and it has a positioning recess 26 for receiving the positioning projection 18.

In accordance with the present invention, the two bearing surfaces 17 and 19 are plane and constitute a projecting substantially dihedral-angled portion, while the ferrule receiver 20 has two plane reception surfaces 22 and 24 form a re-entrant substantially dihedral-angled portion complementary to said projecting dihedral-angled portion 18, 19. This simple disposition ensures that said two bearing surfaces press simultaneously against respective ones of the two reception surfaces, said projecting and re-entrant dihedral-angled portions also constituting the positioning projection 18 and the position recess 26, respectively.

Preferred additional dispositions also included in the device given by way of example are now described.

Each bearing surface such as 17 remains in contact with the complementary reception surface 22 up to a longitudinal line of contact 28 between the ferrule 16 and its receiver 20. A side face 30 of the ferrule then slopes away from a disengaged face 32 of the ferrule receiver constituting a re-entrant substantially dihedral-angled portion 30, 32 which defines a dihedral angle of more than 90°. This dihedral angle may be referred to as an angle "of accessibility" in the sense that the larger the angle the easier the access to said line of contact for a beam of welding energy. In order to fix the ferrule on its receiver by means of such a beam, the materials of the ferrule and of the receiver should be selected so as to be suitable for being welded together.

More particularly, the material selected for the ferrule and for its receiver should be a hard metal having a low coefficient of thermal expansion, and the dihedral angle of accessibility should be about 135°.

The device is then made by means of the following operations:

the support structure 2 carrying the optical components 4, 6, and 8, and the ferrule receiver 20 are made;

the ferrule 16 is made;

the transversely anisotropic fiber 10 is positioned and secured in said ferrule 16;

the bearing surfaces 17 and 19 of said ferrule are pressed against the reception surfaces 22 and 24 of the receiver; and the ferrule is welded to the receiver along their longitudinal join lines 28.

More particularly, the ferrule 16 is fixed to the receiver 20 by spot welding, e.g. two spots along each of the two join lines such as 28. These weld spots are made by means of a YAG laser whose beam 40 (represented by an arrow in FIG. 3) maintains an unchanging direction which is common to both of the dihedral angles of accessibility defined at each of the two join lines such as 28.

The cross-section of the ferrule 16 is preferably substantially a quadrilateral having two adjacent sides defining the two bearing surfaces 17 and 19, two opposite vertices 36 and 38 of said quadrilateral defining the two join lines 28, with the two disengaged faces 32 of the ferrule receiver extending in the same plane that includes said two join lines. More particularly, as shown, a square shape is chosen because it is easy to make and to handle.

Advantageously, in particular when a ferrule is used whose cross-section is square, means are provided for identifying the two bearing surfaces: said means may be a line or a point formed on the ridge of the dihedral angle formed substantially by said two surfaces.

Conventional techniques are used for positioning and fixing the fiber 10 inside the ferrule 16 and for positioning and fixing the ferrule receiver 20 on the support 2, the receiver being previously fitted with the ferrule having the fiber secured therein.

We claim:

1. A device comprising:

a transversely anisotropic optical fiber for guiding a guided light, said optical fiber having a longitudinal axis and a plane of polarization intersecting said axis of said fiber, a ferrule (16) surrounding and carrying said fiber (10), a ferrule receiver (20) receiving said ferrule, and an optical component secured to said ferrule receiver for interacting with an interacting light having in said optical component a plane of polarization along a plane of said optical component, and said ferrule having a projecting, substantially dihedral-angled portion (17, 19) engaged in a complementary re-entrant substantially dihedral-angled portion (22, 24) formed in said ferrule receiver (20) to ensure coincidence between respective planes of polarization of said guided and interacting lights.

2. A device according to claim 1, comprising:

a support structure (2);

said ferrule receiver being fixed to said structure, such that said plane of polarization of said fiber is defined relative to said structure;

said ferrule (16) securely carrying and surrounding said fiber (10) and having a side surface parallel to said longitudinal axis (12), a cross-section of said side surface having a positioning projection (18) which is angularly located so that the polarization plane of said fiber is defined by the angular position of said projection, said side surface having bearing surfaces (17, 19) for enabling said ferrule to be carried and for defining its position in transverse translation; and a ferrule receiver (20) carried by said support structure (2) and receiving said ferrule having reception surfaces (22, 24) for receiving the bearing surfaces of said ferrule and having a positioning recess (26) which is angularly positioned to receive said positioning projection (18) in such a manner that when said bearing surfaces bear against said reception surfaces and said projection is inserted in said recess, said plane of polarization of the light is caused to coincide with the polarization plane of the fiber;

said side surface of the ferrule (16) has two plane bearing surfaces (17, 19) forming a projecting substantially dihedral-angled portion, and the ferrule receiver (20) two plane reception surfaces (22, 24) forming a re-entrant substantially dihedral-angled portion complementary to said projecting dihedral-angled portion (18, 19), said two bearing surfaces being pressed simultaneously against respective ones of said reception surfaces, and wherein said projecting sand re-entrant dihedral-angled portions also constitute said positioning projection (18) and said positioning recess (26) respectively.

3. A device according to claim 2, wherein each of the bearing surfaces (17) of the ferrule remains in contact with a complementary reception surface (22) up to longitudinal join lines (28) between the ferrule (16) and the ferrule receiver (20), a lateral face (30) of the ferrule then going away from a disengaged face (32) of the ferrule receiver and forming a re-entrant substantially dihedral-angled portion (30, 32) which defines a dihedral angle of accessibility of more than 90°, thereby facilitating access to said join lines by a beam of welding energy, the materials of said ferrule and of said receiver being weldable.

4. A device according to claim 3 wherein the cross-section of the ferrule (16) is a quadrilateral having two adjacent sides defining the said two bearing surfaces (17, 19), two opposite vertices of said quadrilateral (36, 38) defining substantially said two longitudinal join lines (28), the said two disengaged faces (32) of the ferrule receiver lying in the same plane that includes said two lines.

5. A device according to claim 4 wherein the cross-section of the ferrule (16) is a square.

6. A method of making a laser-emitting head device for use in an optical fiber telecommunications network comprising the steps of:

fixing a semiconductor laser chip (4), a crystal plate (6) surrounded by a permanent magnet (7) constituting a Faraday rotator and focusing lens (8) on a support structure;

forming a ferrule (16) for securely carrying and surrounding said fiber (10) with a side surface of said ferrule extending parallel to a longitudinal axis of the ferrule and having a crosssection of said surface including a positioning projection (18) which is angularly located so that the privileged plane of the optical fiber is defined by the angular position of said projection and with the side surface having bearing surfaces (17, 19) for enabling said ferrule to be carried by said support structure and for defining its position in transverse translation;

positioning and fixing a transversely anisotropic fiber (10) inside said ferrule (16), said ferrule (16) having a side surface surrounding and carrying said optical fiber and having a projecting substantially dihedral-angled portion (17, 19) engaged in a complementary re-entrant substantially dihedral angled portion (22, 24) of said ferrule receiver (20) to ensure coincidence firstly between a privileged plane defined relative to said optical fiber which matches the polarization of light in order to facilitate guided transmission of said light by said fiber, and secondly the plane of polarization of light interacting with one of said laster chip, said crystal plate, said Faraday rotator and said focusing lens (8);

forming a ferrule receiver (20) to receive said ferrule, with the ferrule receiver having reception surfaces (22, 24) for receiving the bearing surfaces of said ferrule and having a positioning recess (26) which is angularly positioned to receive said positioning projection (18) such that when said bearing surfaces bear against said reception surfaces and said projection is inserted in said recess, the plane of polarization of the light is caused to coincide with the privileged plane of the optical fiber, said side surface of the ferrule (16) having two plane bearing surfaces (17, 19) forming a projecting substantially dihedral-angled portion and the ferrule receiver (20) presenting two plane reception surfaces (22, 24) forming a re-entrant substantially dihedral-angled portion complementary to the projecting dihedral-angled portion (18, 19) thereby ensuring that said two bearing surfaces can be pressed simultaneously against respective ones of said reception surfaces, and that said projecting and re-entrant dihedral-angled portions also constituting said positioning projection (18) and said positioning recess (20) respectively and mounting said ferrule receiver to said support structure;

fitting said ferrule (16) within said ferrule receiver (20) by causing said bearing surfaces (17, 19) of said ferrule to bear against said reception surfaces (22, 24) of said receiver, whereby each of the bearing surfaces (17) of the ferrule remains in contact with a complementary reception surface (22) up to a longitudinal join line (28) between the ferrule (16) and the ferrule receiver (20), with a lateral face (30) of the ferrule going away from a disengaged face (32) of the ferrule receiver and forming said re-entrant substantially dihedral-angled portion (30, 32) which defines a dihedral angle of accessibility of more than 90° thereby facilitating access to said join line by a beam of welding energy, and wherein the materials of said ferrule and said receiver are weldable; and bonding said ferrule to said receiver by welding along said longitudinal join lines of said ferrule and said receiver.

7. A method according to claim 6, wherein said bonding step is performed by spot welding by employing a laser beam (40) propagating in the same direction for both longitudinal join lines (28).

* * * * *